Figure 1:
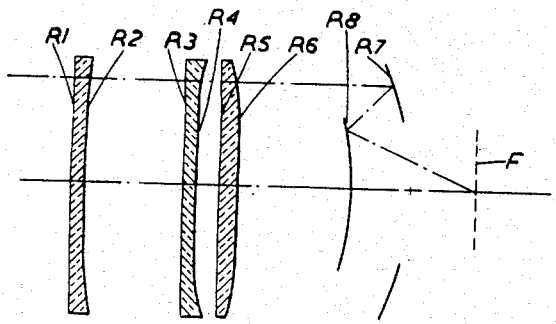

July 31, 1945.　　　A. WARMISHAM　　　2,380,888
OPTICAL OBJECTIVE
Filed June 30, 1942　　　2 Sheets-Sheet 1

INVENTOR
A. Warmisham

July 31, 1945. A. WARMISHAM 2,380,888
OPTICAL OBJECTIVE
Filed June 30, 1942    2 Sheets-Sheet 2

INVENTOR
A. WARMISHAM,
BY
ATTORNEYS

Patented July 31, 1945

2,380,888

UNITED STATES PATENT OFFICE 2,380,888

OPTICAL OBJECTIVE

Arthur Warmisham, Leicester, England, assignor to Taylor, Taylor & Hobson Limited, Leicester, England, a company of Great Britain Application June 30, 1942, Serial No. 449,131
In Great Britain July 3, 1941

12 Claims. (Cl. 88—57)

This invention relates to optical objectives for photographic or projection or other purposes, and is more particularly concerned with objectives of the kind in which the optical power is supplied by spherical reflecting surfaces.

The present applicant's copending United States of America patent application Serial No. 394,709, filed May 22, 1941, relates to an objective of this kind wherein one or more substantially afocal correcting surfaces, each intersecting the optical axis substantially at the equivalent centre of curvature of one of the spherical reflecting surfaces, are employed for effecting correction of the spherical aberration, coma and astigmatism of such surfaces. It should be mentioned that the term "equivalent centre of curvature" as used herein is to be understood to mean the actual centre of curvature of the surface or, if there are any elements intervening between the surface and its centre, the image of such centre formed by paraxial imagery by such intervening elements.

Each such correcting surface may be constituted by one of the surfaces of a transparent plate through which the light is transmitted or by a reflecting surface, and the surface may be paraxially afocal or (in the case when the light is transmitted through the surface) may be made afocal for a selected zone such as to reduce the chromatic difference of spherical aberration to a minimum.

Satisfactory objectives can be obtained in accordance with such prior arrangement, but the arrangement is not very readily adaptable to suit different circumstances without sacrificing a high degree of correction for some aberrations.

The present invention has for its object to provide a novel and improved combination of spherical reflecting surfaces and afocal correcting surfaces, which will give much greater latitude for the correction of higher order aberrations and will make it possible to obtain complete correction of at least three of the aberrations.

A further object of the invention is materially to reduce the overall axial length of the objective and thereby to make it possible for the objective to give good illumination over a wide angular field.

As in the arrangement of the copending application Serial No. 394,709, filed May 22, 1941, above mentioned, each afocal correcting surface may be in the form of a reflecting surface or may consist of one of the surfaces of a transparent plate through which the light is transmitted. The correcting surfaces may be paraxially afocal, in which case each surface will consist of a surface of revolution generated by rotation about the $x$-axis of a curve of the form (in Cartesian coordinates $x, y$)

$$x = Ay^4 + By^6 + \ldots \text{ higher even powers of } y$$

When transmitting correcting surfaces are used, however, the transparent plates will give rise to a chromatic difference of spherical aberration, and the correcting surfaces may, if desired, be made afocal for a selected zone such as to reduce such chromatic difference to a minimum, in which case the equation to the generating curve will take the form $$X = \tfrac{1}{2}\tfrac{y^2}{b} + Ay^4 + \ldots \text{ higher powers of } y$$

where $b$ is a constant large in comparison with the equivalent focal length of the objective.

A further object of the invention is to provide other means for correcting for the chromatic difference of spherical aberration arising when transmitting correcting surfaces are used, which may be employed instead of or in addition to that described in the specification of the said copending application.

Further objects of the invention will be apparent from the appended claims and from the following description of the accompanying drawings, in which Figures 1 to 7 respectively show seven convenient practical examples of objective according to the invention, for which numerical data are given in the seven tables below.

In these tables the radii of curvature of the individual surfaces are indicated by $R_1 R_2 \ldots$ counting from the front (that is the side of the longer conjugate), the positive sign indicating that the surface is convex to the front and the negative sign that it is concave thereto. For the three correcting surfaces the tables give instead of the radii of curvature the equations to the generating curves in Cartesian coordinates $(x, y)$ with the origin at the vertex of the surface and the x-axis coincident with the optical axis. $D_{12}$ $D_{23}$ ... represent the axial distances between the correspondingly numbered individual surfaces, the negative sign where given (as for example for $D_{76}$ in Example I) indicating that the second of the two surfaces ($R_6$) is in front of the first ($R_7$). It will be noticed that in the first three examples, which have been calculated to correct for first order aberrations only, the transparent plates bearing the correcting surfaces have been assumed to be made of a glass having a mean refractive index 1.5.

In the construction of Figure 1, the light first passes through three transparent plates, $R_1$ $R_2$, $R_3$ $R_4$ and $R_5$ $R_6$ each having its front surface $R_1$ or $R_3$ or $R_5$ plane and its rear surface $R_2$ or $R_4$ or $R_6$, deformed from the true plane to constitute a correcting surface, and is then reflected in turn at an annular concave spherical mirror $R_7$ and at a convex spherical mirror $R_8$, whence it passes to the focal plane F. The three correcting surfaces $R_2$ $R_4$ $R_6$ are paraxially afocal, the first two being slightly convex to the front and the third slightly concave to the front. Numerical data for one example of this construction are given in the table below. In this example, the deformations of the three correcting surfaces $R_2$ $R_4$ $R_6$ from the true plane are so chosen that the net sum of the spherical aberration, coma and astigmatism of the three surfaces balances to the first order of the net sum of the corresponding aberrations of the two spherical mirrors $R_7$ $R_8$. The two spherical mirrors have equal and opposite curvatures, so that the objective gives an image field flat to the first order, and the whole objective has only slight residual distortion. This example has been calculated to give correction only for the first order aberrations but, owing to the latitude afforded by the provision of the three correcting surfaces, the example can be readily modified to correct for the higher order aberrations also.

*Example I*

| Radius | Thickness or air separation | Refractive index $n_D$ |
|---|---|---|
| $R_1$ ∞ | $D_{12}$ 0 | 1.5 |
| $R_2$ $z=+.1485$ $y^4+$ ... higher even powers of $y$ | $D_{23}$ .40 | |
| $R_3$ ∞ | $D_{34}$ 0 | 1.5 |
| $R_4$ $z=+.3805$ $y^4+$ ... higher even powers of $y$ | $D_{45}$ .10 | |
| $R_5$ ∞ | $D_{56}$ 0 | 1.5 |
| $R_6$ $z=-.3102$ $y^4+$ ... higher even powers of $y$ | $D_{67}$ .70 | |
| $R_7$ −1.0 | $D_{78}$ −.25 | |
| $R_8$ −1.0 | | |

Distance of focal plane from $R_8+$.50.
Equivalent focal length 1.000.

Figure 2:
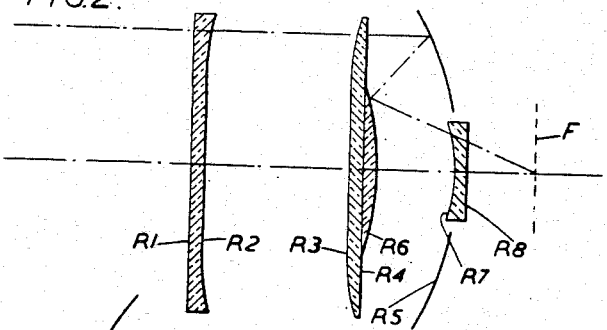

The construction of Figure 2 differs from that of Figure 1 in that two only of the transparent plates $R_1$ $R_2$ and $R_3$ $R_4$ are disposed in front of the spherical mirrors $R_5$ $R_6$ whilst the third $R_7$ $R_8$ is located within the aperture of the annular concave mirror $R_5$. This arrangement considerably reduces the overall length of the objective, and thereby enables a marked improvement to be made in respect of vignetting. Numerical data for one example of this construction are given in the following table. This example has also been calculated to correct for first order aberrations only, the three aberrations corrected by the afocal surfaces $R_2$ $R_3$ $R_7$ being spherical aberration, coma and astigmatism. Field curvature is accurately corrected to the first order and there is small residual distortion.

*Example II*

| Radius | Thickness or air separation | Refractive index $n_D$ |
|---|---|---|
| $R_1$ ∞ | $D_{12}$ 0 | 1.5 |
| $R_2$ $z=+.4387$ $y^4+$ ... higher even powers of $y$ | $D_{23}$ .5 | |
| $R_3$ $z=+.2267$ $y^4+$ ... higher even powers of $y$ | $D_{34}$ 0 | 1.5 |
| $R_4$ ∞ | $D_{45}$ .3 | |
| $R_5$ −1.0 | $D_{56}$ −.25 | |
| $R_6$ −1.0 | $D_{67}$ .25 | |
| $R_7$ $z=-1.826$ $y^4+$ ... higher even powers of $y$ | $D_{78}$ 0 | 1.5 |
| $R_8$ ∞ | | |

Distance of focal plane from $R_8+$.25.
Equivalent focal length 1.000.

Figure 3:
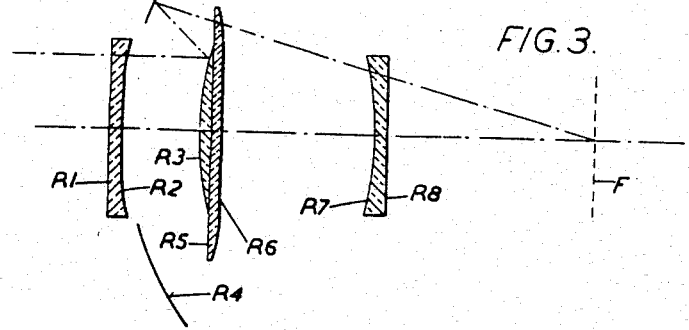
Figure 4:
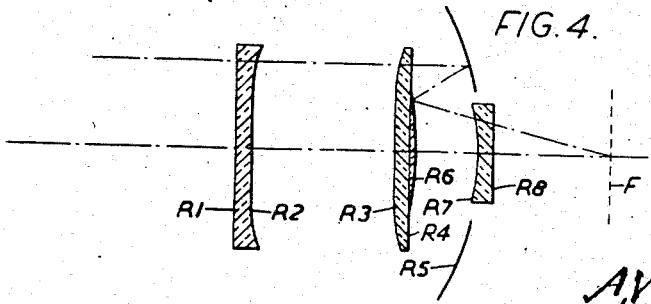

The construction of Figure 3 may be regarded as an inversion of that of Figure 2, the light first passing through a transparent plate $R_1$ $R_2$ in the aperture of the annular concave mirror $R_4$ and then being reflected in turn at the convex and concave mirrors $R_3$ $R_4$, whence it passes through the other two plates $R_5$ $R_6$ and $R_7$ $R_8$ to the focal plane F. In other respects this arrangement is closely analogous to that of Figure 2 and likewise has a relatively short overall length. Numerical data for one example of this construction are given in the following table.

*Example III*

| Radius | Thickness or air separation | Refractive index $n_D$ |
|---|---|---|
| $R_1$ ∞ | $D_{12}$ 0 | 1.5 |
| $R_2$ $z=+.2416$ $y^4+$ ... higher even powers of $y$ | $D_{23}$ .25 | |
| $R_3$ 1.0 | $D_{34}$ −.25 | |
| $R_4$ 1.0 | $D_{45}$ .3 | |
| $R_5$ ∞ | $D_{56}$ 0 | 1.5 |
| $R_6$ $z=-.3297$ $y^4+$ ... higher even powers of $y$ | $D_{67}$ .5 | |
| $R_7$ $z=-.0267$ $y^4+$ ... higher even powers of $y$ | $D_{78}$ 0 | 1.5 |
| $R_8$ ∞ | | |

Distance of focal plane from $R_8+$.70.
Equivalent focal length 1.000.

The foregoing examples, as has been mentioned, have been calculated to correct only for first order aberrations, but can readily be extended to take the higher order aberrations into account. The following example (shown in Figure 4) may be instanced as such an extension of Example II.

Example IV

| Radius | Thickness or air separation | Refractive index $n_D$ |
|---|---|---|
| $R_1$ ∞ | | |
| $R_2$ $x=+.44446\ y^4+.42174\ y^6+.90830\ y^8+.87106\ y^{10}$ | $D_{12}$ .050 | 1.613 |
| | $D_{23}$ .450 | |
| $R_3$ $x=+.33772\ y^4+.01832\ y^6+.36107\ y^8-1.0241\ y^{10}$ | | |
| | $D_{34}$ .050 | 1.613 |
| $R_4$ ∞ | | |
| | $D_{45}$ .219 | |
| $R_5$ −.9804 | | |
| | $D_{56}$ −.197 | |
| $R_6$ −1.1494 | | |
| | $D_{67}$ .197 | |
| $R_7$ $x=-1.123\ y^4$ | | |
| | $D_{78}$ .050 | 1.613 |
| $R_8$ ∞ | | |

Distance of focal plane from $R_8$ +.37059.
Equivalent focal length .99922.

Figure 5:
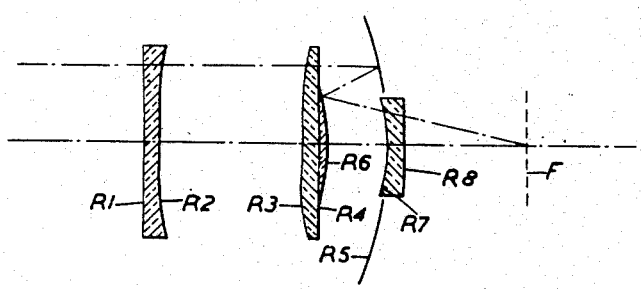
Figure 6:
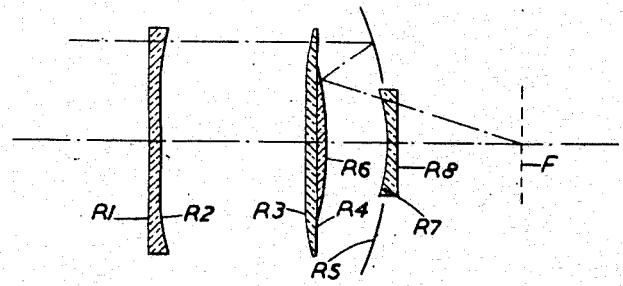
Figure 7:
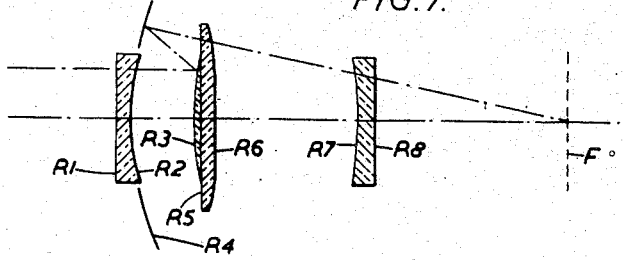

The use of transparent plates for carrying the correcting surfaces necessarily gives rise to chromatic difference of spherical aberration, and if desired, the paraxially afocal correcting surfaces may be replaced by surfaces made afocal for a selected zone such as to reduce such chromatic difference to a minimum. Instead of this, or in addition thereto, the materials of which the transparent plates are made may be chosen to have dispersive powers such that the chromatic difference of spherical aberration is balanced out at least to the first order in respect of a selected zone. One example of this, otherwise resembling Figure 2, is shown in Figure 5 and numerical data are given in the following table. It will be noticed that the dispersive power of the glass used for the second plate is different from that used for the first and third plates, the arrangement being such as substantially to balance out the chromatic difference of spherical aberration for a selected zone of radius .5.

Example V

| Radius | Thickness or air separation | Refractive index $n_D$ | Abbé V number |
|---|---|---|---|
| $R_1$ ∞ | | | |
| $R_2$ $x=+.4445\ y^4+\ldots$ higher even powers of $y$ | $D_{12}$ .050 | 1.613 | 59.3 |
| | $D_{23}$ .450 | | |
| $R_3$ $x=+.3214\ y^4+\ldots$ higher even powers of $y$ | | | |
| | $D_{34}$ .051 | 1.644 | 48.3 |
| $R_4$ ∞ | | | |
| | $D_{45}$ .219 | | |
| $R_5$ −.9804 | | | |
| | $D_{56}$ −.197 | | |
| $R_6$ −1.1494 | | | |
| | $D_{67}$ .197 | | |
| $R_7$ $x=-1.123\ y^4+\ldots$ higher even powers of $y$ | | | |
| | $D_{78}$ .050 | 1.613 | 59.3 |
| $R_8$ ∞ | | | |

Distance of focal plane from $R_8$ +.371.
Equivalent focal length 1.00.

In the foregoing examples the transparent plates have been made of optical glass, but it may be required to utilise the objective according to the invention for ultra-violet or infra-red rays. This can be readily achieved by the use for three plates of vitreous quartz or crystalline potassium chloride or crystalline magnesium oxide in the form known as β-MgO or other substance transparent over a wide spectral range extending considerably beyond the limits of the visible spectrum, the reflecting surfaces being constituted by metallic or metallised surfaces, aluminium and silver being especially useful for the purpose.

Numerical data for two such examples (shown respectively in Figures 6 and 7) are given in the following tables.

Example VI

| Radius | Thickness or air separation | Refractive index $n_D$ | Abbé V number |
|---|---|---|---|
| $R_1$ ∞ | | | |
| $R_2$ $x=+.5941\ y^4+\ldots$ higher even powers of $y$ | $D_{12}$ .045 | 1.4585 | 67.9 |
| | $D_{23}$ .450 | | |
| $R_3$ $x=+.4516\ y^4+\ldots$ higher even powers of $y$ | | | |
| | $D_{34}$ .045 | 1.4585 | 67.9 |
| $R_4$ ∞ | | | |
| | $D_{45}$ .219 | | |
| $R_5$ −.9804 | | | |
| | $D_{56}$ −.197 | | |
| $R_6$ −1.1494 | | | |
| | $D_{67}$ .197 | | |
| $R_7$ $x=-1.501\ y^4+\ldots$ higher even powers of $y$ | | | |
| | $D_{78}$ .045 | 1.4585 | 67.9 |
| $R_8$ ∞ | | | |

Distance of focal plane from $R_8$ +.371.
Equivalent focal length 1.000.

Example VII

| Radius | Thickness or air separation | Refractive index $n_D$ | Abbé V number |
|---|---|---|---|
| $R_1$ ∞ | | | |
| $R_2$ $x=+.3611\ y^4+$ higher even powers of $y$ | $D_{12}$ .046 | 1.4904 | 44.5 |
| | $D_{23}$ .197 | | |
| $R_3$ 1.1494 | | | |
| | $D_{34}$ −.197 | | |
| $R_4$ .9804 | | | |
| | $D_{45}$ .219 | | |
| $R_5$ ∞ | | | |
| | $D_{56}$ .046 | 1.4904 | 44.5 |
| $R_6$ $x=-.5472\ y^4+\ldots$ higher even powers of $y$ | | | |
| | $D_{67}$ .450 | | |
| $R_7$ $x=-1.3835\ y^4+\ldots$ higher even powers of $y$ | | | |
| | $D_{78}$ .046 | 1.4904 | 44.5 |
| $R_8$ ∞ | | | |

Distance of focal plane behind $R_8$ .613.
Equivalent focal length 1.000.

In Example VI the three plates are all made of fused quartz, so that the objective can be used over a wave-length range from 2000 A. to 35,000 A., whilst in Example VII the material used is potassium chloride giving a range covering the visible spectrum and the ultra-violet down to 2000 A.

It will be appreciated that the foregoing arrangements have been described by way of example only and may be modified in a variety of ways within the scope of the invention.

What I claim as my invention and desire to secure by Letters Patent is:

1. An optical objective, comprising in axial alignment two spherical reflecting surfaces supplying substantially the whole of the optical power of the objective one of such surfaces being convex and the other annular and concave, and three substantially afocal correcting surfaces whose shapes are so interrelated as to afford correction of three of the four aberrations, spherical aberration, coma, astigmatism and distortion, of the reflecting surfaces.

2. An optical objective as claimed in claim 1, in which two of the correcting surfaces are disposed on one side of the pair of spherical reflecting surfaces and the remaining correcting surface on the other side thereof.

3. An optical objective, comprising in axial alignment two spherical reflecting surfaces supplying substantially the whole of the optical power of the objective, one of such surfaces being convex and the other annular and concave, and three substantially afocal correcting surfaces for effecting correction of three of the four aberrations, spherical aberration, coma, astigmatism and distortion, of the reflecting surfaces, two of the correcting surfaces being disposed on one side of the pair of reflecting surfaces whilst the third is disposed on the other side thereof approximately within the aperture in the annular concave reflecting surface.

4. An optical objective, comprising in axial alignment two spherical reflecting surfaces supplying substantially the whole of the optical power of the objective, one being convex and the other annular and concave, and three substantially afocal correcting surfaces whose shapes are so interrelated as to afford correction of three of the four aberrations, spherical aberration, coma, astigmatism and distortion, of the reflecting surface, the correcting surfaces each being constituted by one of the surfaces of a transparent plate through which the light is transmitted, such plates being made of materials having dispersive powers so interrelated that the chromatic difference of spherical aberration is corrected in respect of a selected zone.

5. An optical objective as claimed in claim 3, in which the correcting surfaces are each constituted by one of the surfaces of a transparent plate through which the light is transmitted, such plates being made of materials having dispersive powers such that the chromatic difference of spherical aberration is corrected in respect of a selected zone, the plates bearing the two outer correcting surfaces being made of material having a high Abbé V number, whilst that bearing the middle correcting surface is made of a material having a lower Abbé V number.

6. An optical objective, comprising in axial alignment two spherical reflecting surfaces supplying substantially the whole of the optical power of the objective, one being convex and the other annular and concave, and three substantially afocal correcting surfaces whose shapes are so interrelated as to afford correction of three of the four aberrations, spherical aberration, coma, astigmatism and distortion, of the reflecting surface, the parts of the objective through which light is transmitted being made of materials transparent over a wide spectral range extending considerably beyond the limits of the visible spectrum.

7. An optical objective as claimed in claim 3, in which the correcting surfaces are each constituted by one of the surfaces of a transparent plate through which the light is transmitted, such plates being made of materials transparent over a wide spectral range extending considerably beyond the limits of the visible spectrum.

8. An optical objective comprising in axial alignment two spherical reflecting surfaces supplying substantially the whole of the optical power of the objective, and three substantially afocal correcting surfaces each in the form of a surface of revolution generated by rotation about the $x$-axis of a curve of the form $$x = Ay^4 + By^6 + \ldots \text{ higher even powers of } y$$

wherein $x$ and $y$ are the variable parameters of a Cartesian system of coordinates having origin at the vertex and with the $x$-axis coincident with the optical axis, and $A, B \ldots$ are the coefficients of the powers of $y$ and are chosen to effect correction of three of the four aberrations, spherical aberration, coma, astigmatism and distortion, of the reflecting surfaces.

9. An optical objective as claimed in claim 8, in which one of the spherical reflecting surfaces is convex and the other annular and concave, the light first passing through two of the correcting surfaces and then being reflected in turn at the concave and convex surfaces and finally passing through the third correcting surface, which is located approximately within the aperture of the concave annular reflecting surface.

10. An optical objective comprising in axial alignment two spherical reflecting surfaces, and three substantially afocal correcting surfaces each in the form of one of the surfaces of a transparent plate through which the light is transmitted, and having numerical data substantially as set forth in the following table:

| Radius | Thickness or air separation | Refractive index $n_D$ |
|---|---|---|
| $R_1 \infty$ | | |
| $R_2\ x = +.44446\ y^4 + .42174\ y^6 + .90830\ y^8 + .87106\ y^{10}$ | $D_{12}$  .050 | 1.613 |
| $R_3\ x = +.33772\ y^4 + .01832\ y^6 + .36107\ y^8 - 1.0241\ y^{10}$ | $D_{23}$  .450 | |
| $R_4 \infty$ | $D_{34}$  .050 | 1.613 |
| $R_5 -.9804$ | $D_{45}$  .219 | |
| $R_6 -1.1494$ | $D_{56} -.197$ | |
| $R_7\ x = -1.123\ y^4$ | $D_{67}$  .197 | |
| $R_8 \infty$ | $D_{78}$  .050 | 1.613 |

Distance of focal plane from $R_8 + .37059$.
Equivalent focal length .99922.

wherein $R_1 \ldots$ represent the radii of curvature of the individual surfaces except for those for which the equations of the generating curves are given in Cartesian coordinates $x$, $y$, and $D_{12} \ldots$ represent the axial air separations between the vertices of the individual surfaces.

11. An optical objective comprising in axial alignment two spherical reflecting surfaces, and three substantially afocal correcting surfaces each in the form of one of the surfaces of a transparent plate through which the light is transmitted, and having numerical data substantially as set forth in the following table:

| Radius | Thickness or air separation | Refractive index $n_D$ | Abbé V number |
|---|---|---|---|
| $R_1 \infty$ | | | |
| $R_2\ x = +.4445\ y^4 + \ldots$ higher even powers of $y$ | $D_{12}$  .050 | 1.613 | 59.3 |
| $R_3\ x = +.3214\ y^4 + \ldots$ higher even powers of $y$ | $D_{23}$  .450 | | |
| $R_4 \infty$ | $D_{34}$  .051 | 1.644 | 48.3 |
| $R_5 -.9804$ | $D_{45}$  .219 | | |
| $R_6 -1.1494$ | $D_{56} -.197$ | | |
| $R_7\ x = -1.123\ y^4 + \ldots$ higher even powers of $y$ | $D_{67}$  .197 | | |
| $R_8 \infty$ | $D_{78}$  .050 | 1.613 | 59.3 |

Distance of focal plane from $R_8 + .371$.
Equivalent focal length 1.00.

wherein $R_1 \ldots$ represent the radii of curvature of the individual surfaces except for those for which the equations of the generating curves are given in Cartesian coordinates $x$, $y$, and $D_{12}$ . . . represent the axial air separations between the vertices of the individual surfaces.

12. An optical objective comprising in axial alignment two spherical reflecting surfaces, and three substantially afocal correcting surfaces each in the form of one of the surfaces of a transparent plate through which the light is transmitted, and having numerical data substantially as set forth in the following table:

| Radius | Thickness or air separation | Refractive index $n_D$ | Abbé V number |
|---|---|---|---|
| $R_1 \infty$ | | | |
| | $D_{12}$ .046 | 1.4904 | 44.5 |
| $R_2\ x=+.3611\ y^4+$ higher even powers of $y$ | | | |
| | $D_{23}$ .197 | | |
| $R_3$ 1.1494 | | | |
| | $D_{34}$ −.197 | | |
| $R_4$ .9804 | | | |
| | $D_{45}$ .219 | | |
| $R_5 \infty$ | | | |
| | $D_{56}$ .046 | 1.4904 | 44.5 |
| $R_6\ x=-.5472 y^4+$ . . . higher even powers of $y$ | | | |
| | $D_{67}$ .450 | | |
| $R_7\ x=-1.3835 y^4+$ . . . higher even powers of $y$ | | | |
| | $D_{78}$ .046 | 1.4904 | 44.5 |
| $R_8 \infty$ | | | |

Distance of focal plane behind $R_8$ .613.
Equivalent focal length 1.000.

wherein $R_1$ . . . represent the radii of curvature of the individual surfaces except for those for which the equations of the generating curves are given in Cartesian coordinates $x$, $y$, and $D_{12}$ . . represent the axial air separations between the vertices of the individual surfaces.

ARTHUR WARMISHAM.